United States Patent [19]

Igarashi

[11] 4,358,044
[45] Nov. 9, 1982

[54] APPARATUS FOR SOLDERING SOLDER ON CERAMIC SUBSTRATE

[75] Inventor: Hitoshi Igarashi, Tokyo, Japan

[73] Assignee: Asahi Glass Company, Ltd., Tokyo, Japan

[21] Appl. No.: 177,649

[22] Filed: Aug. 13, 1980

[30] Foreign Application Priority Data

Aug. 14, 1979 [JP] Japan .................. 54-103401

[51] Int. Cl.³ .................. B23K 20/10; B23K 37/02
[52] U.S. Cl. .................. 228/1 R; 228/10; 228/56.5
[58] Field of Search .................. 228/9, 10, 11, 56.5, 228/6 A, 1 R; 33/185, 169 C, 172 D, 189; 408/72, 79

[56] References Cited

U.S. PATENT DOCUMENTS

| | | | |
|---|---|---|---|
| 2,990,732 | 7/1961 | Ide | 408/79 |
| 3,610,508 | 10/1971 | Laubmeyer | 228/102 X |
| 3,628,716 | 12/1971 | Fastre | 228/1 R |
| 3,646,307 | 2/1972 | Hazel | 228/1 R X |
| 3,661,316 | 5/1972 | Kulicke, Jr. et al. | 228/56.5 |
| 3,757,423 | 9/1973 | Wieg | 33/189X |
| 3,790,738 | 2/1974 | Laub et al. | 228/6 A X |
| 3,960,309 | 6/1976 | Hazel | 228/1 R X |
| 4,052,793 | 10/1977 | Coughlin et al. | 33/185 R X |

FOREIGN PATENT DOCUMENTS 2009842 9/1970 Denmark .
53-9180 4/1978 Japan .

Primary Examiner—Kenneth J. Ramsey
Attorney, Agent, or Firm—Oblon, Fisher, Spivak, McClelland & Maier

[57] ABSTRACT

An apparatus for soldering a solder on a difficultly solderable substrate comprises a vibration tip which is rotatably held and is mounted on an ultrasonic oscillation mechanism and is slidably held to the vertical direction to an object for soldering. A needle part is placed in a predetermined distance and a predetermined direction from the edge of said vibration tip and said needle part is projected in substantially the same level as that of said edge of said vibration tip.

3 Claims, 4 Drawing Figures

APPARATUS FOR SOLDERING SOLDER ON CERAMIC SUBSTRATE

BACKGROUND OF THE INVENTION

1. Field of the Invention

The present invention relates to an apparatus for soldering a solder on a surface of a difficulty solderable substrate such as ceramic substrate. More particularly, it relates to an automatic soldering apparatus by which a soldering operation is remarkably easily carried out to obtain uniform products.

2. Description of the Prior Art

Products obtained by soldering a lead wire etc. on a difficultly solderable substrate such as substrates made of glass, ceramic, porcelain, silicon or germanium have been widely used, in an electronic industries and an automobile industry. Various improvements of the substrates and operations have been considered.

As an apparatus for coating a solder on a surface of a difficulty solderable substrate, it has been found to preferably use an apparatus for coating a solder on a surface of a glass product by applying ultrasonic vibration to a tip which is vertically slidably and rotatably held on a supporting base and placing a solder on a surface contacting the edge of the tip with the object for soldering such as a glass product. In the operation, however, the operator should place the edge of the tip precisely at the position for the soldering and moreover, the time for applying the ultrasonic vibration to the solder is limited. Therefore, it has been not easy to obtain uniform soldered products even though an expert is operated.

SUMMARY OF THE INVENTION

It is an object of the present invention to provide an apparatus for soldering a solder on a ceramic substrate wherein an edge of a vibration tip is easily set at precise position on a surface of a difficulty solderable substrate such as a glass substrate.

Another object of the present invention is to provide the soldering apparatus which can automatically control a period for applying the ultrasonic vibration to the vibration tip after setting it at the precise position.

The foregoing and other objects of the present invention have been attained by providing an apparatus for soldering a solder on a difficultly solderable substrate which comprises a vibration tip which is rotatably held and mounted on an ultrasonic oscillation mechanism and is slidably held to the vertical direction to an object for soldering, wherein a needle part is placed in a predetermined distance and a predetermined direction from the edge of said vibration tip and said needle part is projected in substantially the same level as that of said edge of said vibration tip.

DETAILED DESCRIPTION OF THE PREFERRED EMBODIMENTS

Figure 1:
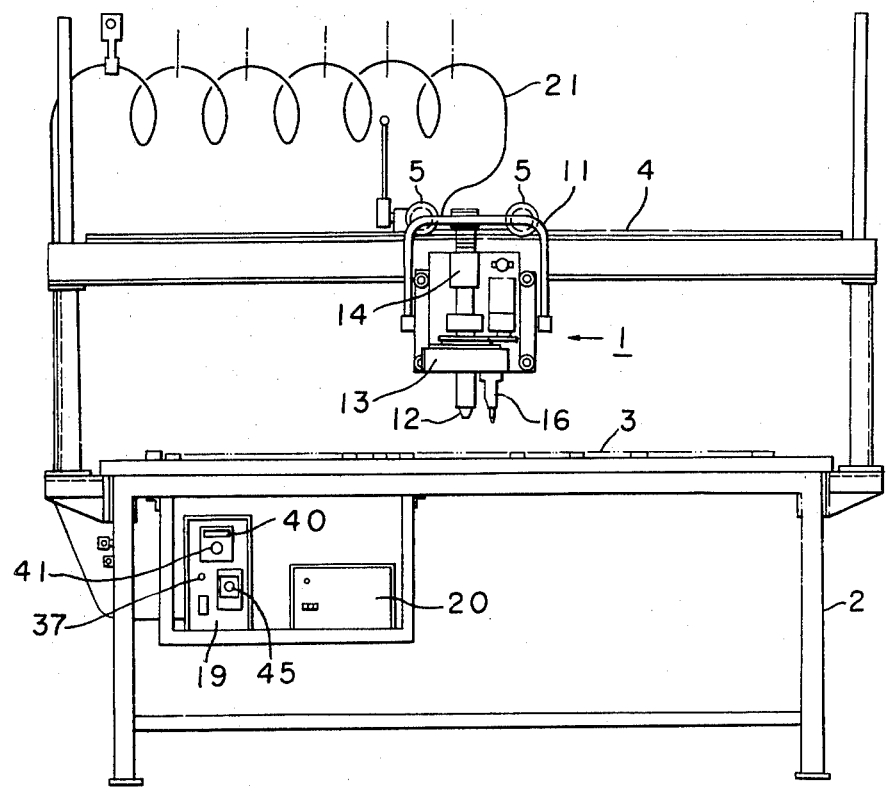
FIG. 1 is a front view of one embodiment of an apparatus for soldering a solder on ceramic substrate according to the present invention.

The position of the needle part depends upon the size, and the configuration of the object for soldering and the direction for shifting the soldering apparatus. Usually, it is preferable to decide the position of the needle part so as to easily provide a marking on the substrate in a relation of the needle part indicating position on the object and the vibration tip contacting position. When the object is small, the apparatus of the present invention can be used by attaching a special auxiliary substrate.

In one embodiment of the present invention, the needle part is projected towards the object side over the level of edge of the vibration tip and is capable of sliding into a cylindrical holder by being kept in contact with the substrate.

In this embodiment, the ultrasonic vibration can be automatically applied to the vibration tip by setting the needle part to a sensor which detects the approach of the edge of the vibration tip to the surface of the object to actuate the ultrasonic oscillation mechanism for the vibration tip. It is also possible to set an optimum period for applying the ultrasonic vibration for soldering by connecting a timer between the ultrasonic oscillation mechanism for the vibration tip and the starting mechanism for the ultrasonic oscillation mechanism.

Referring to the drawings, preferable embodiments of the present invention will be illustrated in detail.

Figure 2:
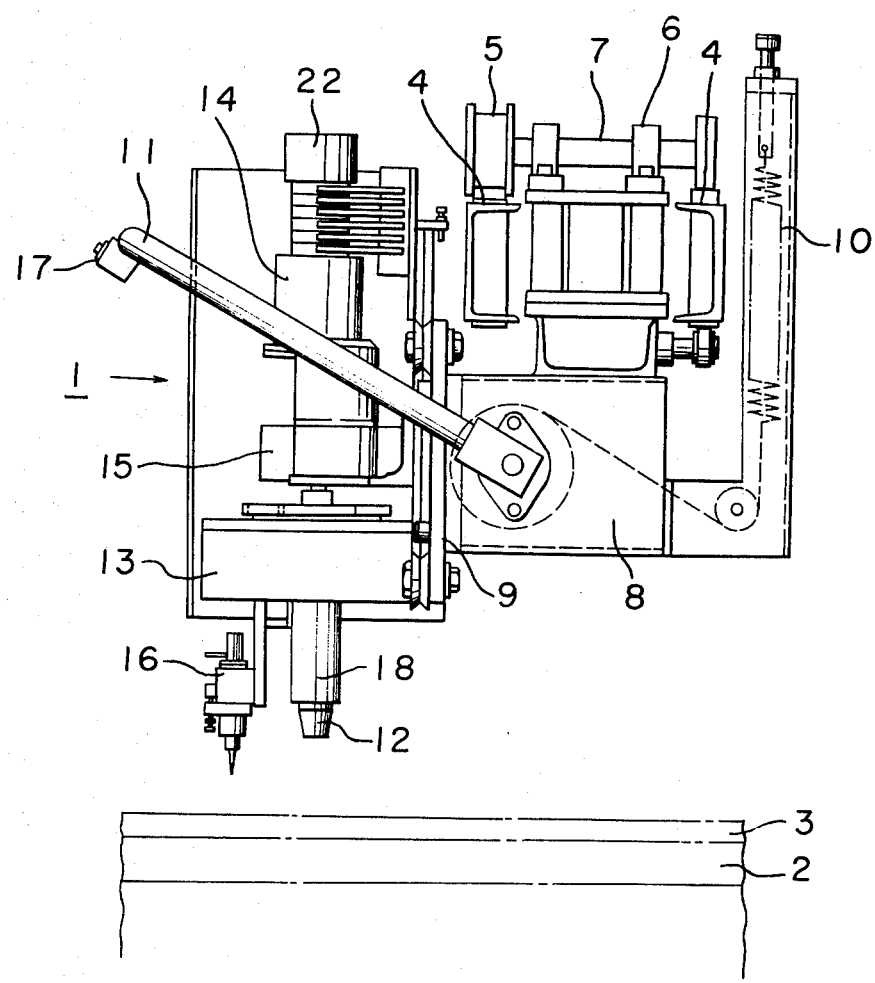
FIG. 2 is a partially enlarged side view of the apparatus of FIG. 1.
Figure 3:
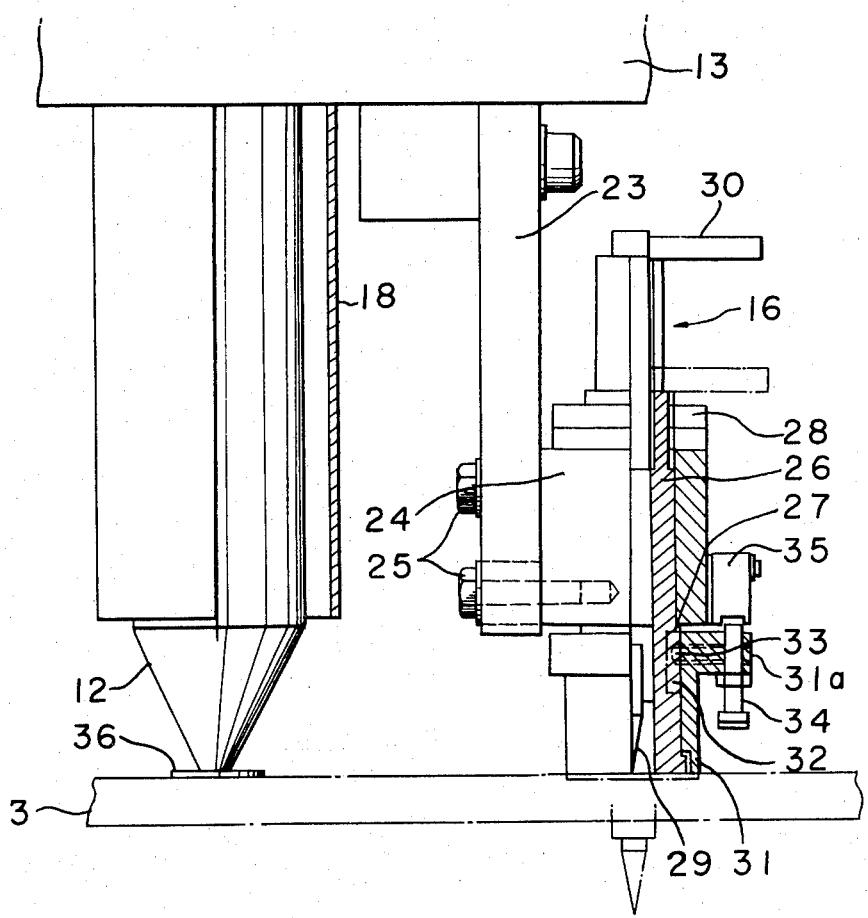
FIG. 3 is a partially sectional front view of a vibration tip and a positioning mechanism.

In FIGS. 1, 2 and 3, the reference numeral (1) designates an apparatus for soldering a solder of the present invention; (2) designates a table on which an object (3) for soldering such as a glass product is placed; parallel rails (4), (4) for shifting the soldering apparatus (1) along the object (3) for soldering are held above the object (3). The soldering apparatus (1) is mounted on a vertically slidable table which is held by grooves (9) formed on a side wall of a holder (8) mounted on a shaft (7) of a pair of wheels (5), (6) held on the rails (4), (4). The gravity applied to the soldering apparatus (1) is balanced by a tensile spring mechanism (10) whereby the vertical movement of the soldering apparatus (1) can be smoothly performed by the vertical operation of the handle (11).

In the embodiment of the apparatus shown in the drawings, the soldering apparatus (1) of the present invention is suspended on the parallel rails (4), (4). It is also possible to lay the parallel rails on the upper surface of the table (2) and to place a truck having wheels for vertically and slidably holding the soldering apparatus on the parallel rails.

The soldering apparatus (1) comprises a vibration tip (12) having an end flat surface having substantially the same area as the area for soldering; a driving mechanism for holding the vibration tip and rotating the tip; a bearing box (13) including a heater for heating the end of the tip; an ultrasonic vibrator unit (14) which is mounted at the upper end of the vibration tip to impart the ultrasonic vibration; a water cooling box (15) for preventing heat conduction to said unit; and a positioning mechanism (16) which precisely decides the position of the end of the tip in the soldering at a predetermined point on the surface of the object such as a glass product by lowering the vibration tip.

In the drawings, the reference numeral (17) designates a push button switch for starting the rotation of the vibration tip (12); (18) designates a heat sealing cover for the tip; (19) designates a control mechanism for controlling the heated temperature of the tip and the timing operation of the ultrasonic vibrator unit (14); (20) designates an ultrasonic oscillator. There elements are connected through cables (21) to a terminal box (22) of the soldering apparatus (1).

The positioning mechanism (16) is mounted on the bearing box (13) and comprises a slide-block (24) fixed by a bolt (25) on the end of a clamp plate (23) which is projected in parallel to the vibration tip (12). A shiftable axial holder (26) is inserted in a hollow part of the slide-block (24) to clamp the slide-block (24) by a ring nut (28) screwed in the thread part on the lower shoulder (27) of the upper part of the holder (26). The holder (26) is also hollow in which a needle part (29) is inserted. The position of the top of the needle part (29) is set to give a predetermined distance from and directional angle to the vibration tip. A marking line is formed on a surface of a glass product depending upon said distance and angle, and the top of the needle part is placed on the marking line whereby the edge of the vibration tip is placed on the position for soldering. Therefore, the soldering operation can be easily performed even though an operator has operated under his special experience in the conventional apparatus. Therefore, the precise positioning can be attained to obtain a high quality product.

Thus, the needle part (29) can be substantially at the same level as that of the edge of the tip (12). In the optimum embodiment, the needle part is usually projected over the level of the edge of the tip to be slidable in the hollow part of the holder (26). In the descending operation for the tip (12), it contacts with the marking line of the surface of the glass product and then, the needle part is put into the the hollow part of the holder (26) depending upon the descending of the tip (12). For this purpose, the axial part of the needle part (29) is formed longer than that of the holder (26) and a stopper (30) which is projected to the transversal direction from the upper part of the axial part so as to slide out the needle part.

The soldering apparatus of the present invention can have a mechanism for automatically starting ultrasonic vibration of the vibration tip (12) when the edge of the vibration tip (12) approaches to the surface of the glass product for the soldering. For this purpose, a vertical slot (32) is formed at the lower part of the holder (26) and a limit switch operation ring (31) which can be vertically slidable for a specific range is fitted on the outer surface of the holder (26) with a screw key (33) kept in the slot. A control screw (34) is upwardly screwed in the screw hole formed in the flange (31a) of the operation ring (31). The edge of the control screw is brought into contact with the push pin of the limit switch (35) mounted on the slide-block (24).

The control of the approached distance for starting the ultrasonic vibration to the vibration tip (12) is carried out as follows.

The vibration tip is kept in a non-vibration state and the edge of the vibration tip (12) is brought into contact with a space gauge (36) (for example, a thickness of 0.2 mm) placed on the surface of the glass product (2). In this condition, the bolt (25) is controlled to contact the lower end of the holder (26) on the surface of the same glass product (2) so as to control the position of the slide-block (24). The position for screwing the control bolt (34) is adjusted so as to operate the limit switch (35) by the control bolt (34) of the limit switch operation ring (31). When said adjusting operation is carried out, the limit switch (35) is actuated by approaching the vibration tip (12) to the distance of 0.2 mm from the surface of the glass product, whereby a signal is applied to the ultrasonic oscillator (20) to actuate the ultrasonic vibration unit.

Figure 4:
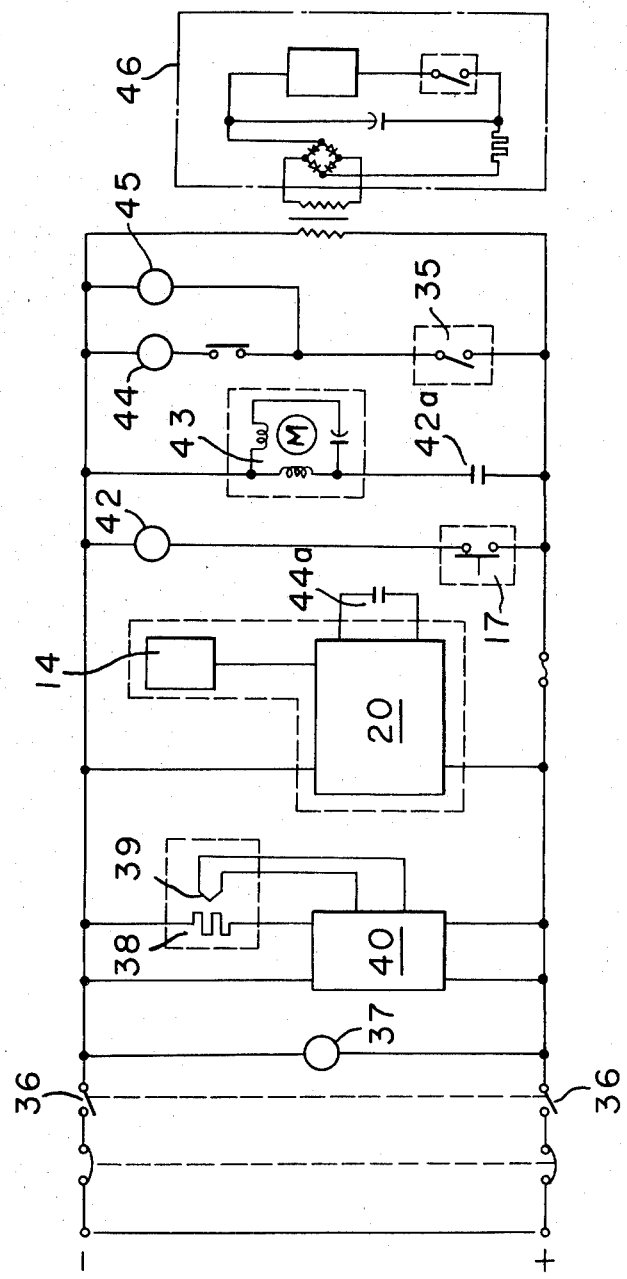
FIG. 4 is an electric circuit diagram for the apparatus.

Referring to FIG. 4, the operation of the apparatus of the present invention will be further illustrated.

An AC power source (100 Volt) is connected to the input terminals of the apparatus of the present invention. A pilot lamp (37) for indicating the application of the power is turned on and an electric heater (38) (500 W) is actuated to heat the vibration tip. The temperature of the tip is measured by a thermocouple (39). The temperature is indicated by a temperature indicator (40) of the control mechanism (19). The temperature of the vibration tip (12) can be controlled by a temperature control dial (41). The soldering apparatus (1) is shifted by an operator above the position for soldering and the handle (11) is operated for the descending operation and the push button (17) is pushed to actuate a relay (42). A contact (42a) of the relay (42) is closed to drive a motor (43) whereby the vibration tip (12) is rotated. The handle (11) is further operated by the operator to contact the needle part (29) on the marking line and to approach the vibration tip (12) to a predetermined distance from the surface of the glass product, whereby the limit switch operation ring (31) is brought into contacted with the surface of the glass product to push up the ring and the limit switch (35) is actuated. Therefore, the relay (44) is actuated to close the contact (44a) whereby the ultrasonic oscillation mechanism (20) is actuated. A timer (45) is connected in parallel to the relay (44) so as to set the period for applying the ultrasonic vibration. After the period, the relay (44) is inactuated to open the contact (44a) whereby the ultrasonic oscillator is stopped. A flow rate detector (46) for a coolant water for cooling the vibration tip is connected.

As described above, in accordance with the present invention, the position for soldering on the object is precisely indicated whereby the quality of the soldered product is kept in remarkably high grade and an experience is not required for an operator and an operation speed can be remarkably improved.

I claim:

1. An apparatus for soldering a solder on a solderable substrate, comprising:
    an ultrasonic oscillation mechanism having a vibration tip rotatably held and slidably mounted thereon, said vibration tip slidably movable in a vertical direction relative to an object for soldering;
    a needle part placed at a predetermined distance and at a predetermined direction from said vibration tip, said needle part projected at about the level of an edge of said vibration tip;
    means for enabling backward shifting of said needle part on contacting of said needle part with said object; and
    means for activating said ultrasonic oscillation mechanism such that ultrasonic vibration is applied to said vibration tip when said needle part is backwardly shifted a predetermined distance.

2. An apparatus according to claim 1, wherein said activating means comprises:
    a cylinder surrounding said needle part;
    an operation ring fitted around and coupled to said cylinder and vertically slidable therearound;

a limit switch coupled to said ultrasonic vibration mechanism for activating the application of ultrasonic vibration to said needle part, said limit switch placed in a path of the vertical sliding of said operation ring and activated thereby.

3. An apparatus according to claims 1 or 2, further comprising:
a timer mechanism coupled to said ultrasonic vibration mechanism for commencing application of ultrasonic vibration at a predetermined time after activation by said activation means.

* * * * *